United States Patent
Perrucci

(10) Patent No.: US 11,514,427 B2
(45) Date of Patent: Nov. 29, 2022

(54) REUSABLE BAG WITH INTEGRATED WIRELESS IDENTIFIER AND METHODS OF OPERATION

(71) Applicant: NCR Corporation, Atlanta, GA (US)

(72) Inventor: Levino Felix Perrucci, Mableton, GA (US)

(73) Assignee: NCR Corporation, Atlanta, GA (US)

( * ) Notice: Subject to any disclaimer, the term of this patent is extended or adjusted under 35 U.S.C. 154(b) by 297 days.

(21) Appl. No.: 16/664,460

(22) Filed: Oct. 25, 2019

(65) Prior Publication Data

US 2021/0125171 A1    Apr. 29, 2021

(51) Int. Cl.

| G06Q 20/32 | (2012.01) |
|---|---|
| G06Q 20/40 | (2012.01) |
| A45C 3/04 | (2006.01) |
| G06Q 20/20 | (2012.01) |
| G06Q 20/18 | (2012.01) |
| G06K 19/07 | (2006.01) |
| G07G 1/00 | (2006.01) |

(52) U.S. Cl.
CPC .......... *G06Q 20/3278* (2013.01); *A45C 3/04* (2013.01); *G06K 19/0723* (2013.01); *G06Q 20/18* (2013.01); *G06Q 20/20* (2013.01); *G06Q 20/3276* (2013.01); *G06Q 20/405* (2013.01); *G07G 1/0036* (2013.01)

(58) Field of Classification Search
None
See application file for complete search history.

(56) References Cited

U.S. PATENT DOCUMENTS

| 2002/0170782 | A1* | 11/2002 | Millikan | G07G 1/0054 |
| | | | | 186/61 |
| 2005/0200515 | A1* | 9/2005 | Cherniakov | G01S 13/767 |
| | | | | 342/51 |
| 2005/0203824 | A1* | 9/2005 | Freud | G06Q 40/00 |
| | | | | 705/37 |
| 2006/0065448 | A1* | 3/2006 | Hudson | G01G 19/14 |
| | | | | 177/148 |
| 2007/0262139 | A1* | 11/2007 | Fiebiger | G06Q 20/4016 |
| | | | | 235/380 |

(Continued)

OTHER PUBLICATIONS

"Josh Constine, Meet Caper, the AI self-checkout shopping cart, Jan. 10, 2019, Autonomous retail beyond Amazon go, Nerdwallet, 2-6" (Year: 2019).*

Primary Examiner — Kito R Robinson
Assistant Examiner — Toan Duc Bui
(74) *Attorney, Agent, or Firm* — Schwegman, Lundberg & Woessner

(57) ABSTRACT

A wireless tag is integrated into a reusable bag. The tag is registered to a payment account. During a transaction, a unique identifier for the tag is wirelessly acquired from the bag and linked to the payment account. When checkout for the transaction is required, the transaction price for the transaction is charged against the linked account without requiring any additional payment screens or payment interfaces at a transaction terminal where the transaction is being processed. In an embodiment, custom use, price, item type, store type, and/or weight restrictions with respect to the transaction and registered with the tag are enforced during checkout by the transaction terminal.

13 Claims, 6 Drawing Sheets

(56) References Cited

U.S. PATENT DOCUMENTS

| | | | |
|---|---|---|---|
| 2010/0200450 A1* | 8/2010 | Weed | A45C 3/04 |
| | | | 206/459.5 |
| 2012/0006599 A1* | 1/2012 | Murdter | G01G 19/4144 |
| | | | 177/1 |
| 2012/0285124 A1* | 11/2012 | Hagger | B65D 33/28 |
| | | | 53/473 |
| 2013/0103519 A1* | 4/2013 | Kountotsis | G06Q 20/28 |
| | | | 705/23 |
| 2015/0130641 A1* | 5/2015 | Rahman | G08G 1/142 |
| | | | 340/932.2 |
| 2015/0317842 A1* | 11/2015 | Evans | G07F 17/3255 |
| | | | 705/13 |

* cited by examiner

REUSABLE BAG WITH INTEGRATED WIRELESS IDENTIFIER AND METHODS OF OPERATION

BACKGROUND

Organizations and consumers are becoming increasingly concerned about the use of plastics and the effects that discarded plastics have on the environment. One area where plastic usage is particularly problematic is grocery shopping. Some countries, states in the United States of America (such as Hawaii), and retailers have completely banned the use of disposable plastic bags for use by consumers when checking out of a store. Some retailers have started charging for any plastic bags provided to their customers in an effort to discourage customer usage of the plastic bags.

Unsurprisingly, nearly every consumer household has a plurality of reusable shopping bags that the carry with them in their cars for use when retail shopping.

Meanwhile, retailers have also made significant strides in streamlining and automating the shopping experience of their customers. For example, consumers can scan item barcodes while shopping using their phones, bag the items, and use a self-checkout station or their phones to pay for the items to checkout of the store. Recent advancements allow consumers to be identified when entering the store through automated check-in mechanisms, pick items off shelves, place the items in bags, and leave the store; the items purchased are identified through images captured of the consumers and paid for via a mobile application on the consumers' phones. This latter type of advancement is referred to as a frictionless store.

Nearly all of the recent advancements require a consumer to be in possession of a phone with an appropriately installed mobile application that is utilized during the automated shopping experience. However, consumers can and do forget their phones, sometimes their phones were left in their cars, sometimes their phones were left at their homes.

The average consumer is aware of the latest shopping service offerings provided by retailers and he/she is usually excited about participating in those service offerings, The average consumer also wants to be an environmentally-conscious consumer and avoid using throw-away plastic bags.

SUMMARY

In various embodiments, a reusable bag with an integrated wireless identifier and methods of operation are presented.

According to an aspect, a method for processing a transaction utilizing a reusable bag with integrated wireless identifier is presented. A unique identifier is received from a wireless tag integrated into a bag during a transaction at a transaction terminal. A payment account that is linked to the unique identifier is obtained. At least a portion of a transaction total for the transaction is processed against the payment account for a checkout of the transaction at the transaction terminal.

DETAILED DESCRIPTION

Figure 1A:
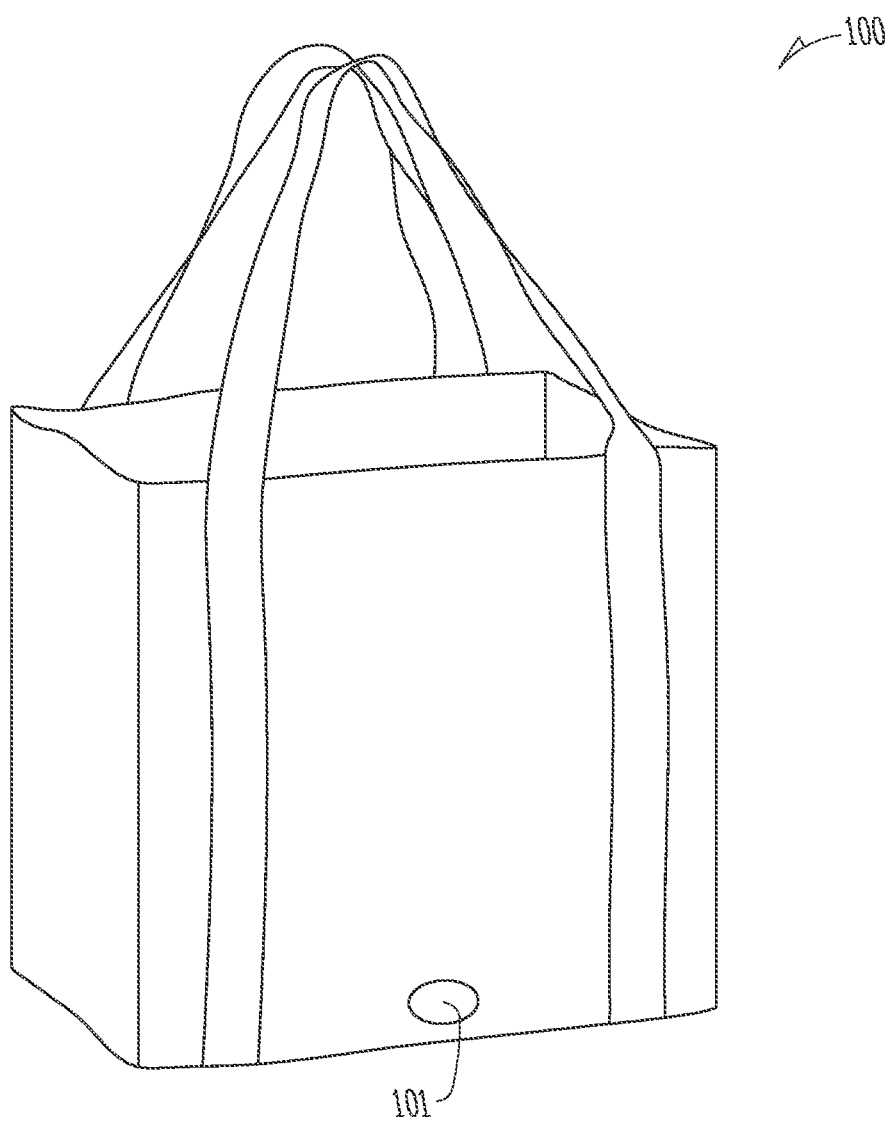
FIG. 1A is a diagram of a reusable bag with an integrated wireless identifier, according to an example embodiment.

FIG. 1A is a diagram of a reusable bag 100 with an integrated wireless identifier, according to an example embodiment.

The bag 100 is made of a non-plastic material and is reusable by a consumer for shopping visits to retailers. The bag 100 includes an integrated wireless tag 101. The tag 101 can be active or passive. An active tag 101 may include a small battery that permits the tag 101 to wirelessly transmit a unique identifier assigned to the tag within a very short range of roughly a meter or two meters. A passive tag 101 is draw power or are activated from a wireless reader (transceiver) through electromagnetic waves emitted by the reader that induce a current in the passive tag's antenna, once powered by the electromagnetic waves, the passive tag 101 can be read by the reader to obtain the tags 101 unique identifier. The tag 101 may also be semi-passive using a battery to run circuitry on the tag 101 while also drawing current sent from a reader to increase power on the tag 101 enough to transmit the unique identifier of the tag 101 to the reader.

In an embodiment, the tag 101 is a Radio Frequency (RF) tag. In an embodiment, the tag 101 is a Near Field Communication (NFC) tag. In an embodiment, the tag 101 is Bluetooth® Low Energy (BLE) tag.

The tag 101 may be woven into the fabric of the reusable bag 100 in any location (handle, side, top, bottom, middle, etc.). Additionally, the bag may include a woven pocket with a snap into which the tag 101 can be placed or removed. Still further, the tag 101 may include an attachment or latching mechanism that allows the tag 101 to be affixed to the bag 100.

The tag 101 may be sold or distributed separate from the bag 100 and then integrated into the bag 100 using a pocket or latching mechanism to affix the tag to the bag 100.

In another case, the tag 101 may be distributed with the bag 100 and integrated into the bag 100, such that removal of the tag 101 from the bag 100 causes damage to the fabric of the bag 100.

The shape and dimensions of the bag 100 can vary.

The tags 101 sold separate and later integrated into the bags 100 or the tags 101 sold already integrated into the bags 100 can be prefabricated with a unique identifier. The unique identifier may also include a portion of the unique identifier that includes an identifier for a retailer associated with or servicing the tag 100. In this way, the transmitted or read unique identifier for the tag 101 can be linked to the retailer that distributed the tag 101.

In an embodiment, the tag 101 is reusable either independent of the bag 100 or dependent on the bag 100. In this embodiment, the tag 101 is a smart tag that includes firmware and circuitry for changing its unique identifier based on wireless interaction with a mobile application. The mobile application receiving the new unique identifier for the tag 101 from a server associated with a retailer that distributes the tag 101. The mobile application then authenticates and connects to the tag 101 and instructs the firmware to change its existing unique identifier to a new unique identifier provided by the server of the retailer.

The unique identifier of the tag 101 and its association with a given reusable bag 100 permits a variety of automated shopping scenarios, which are further discussed herein and below.

Figure 1B:
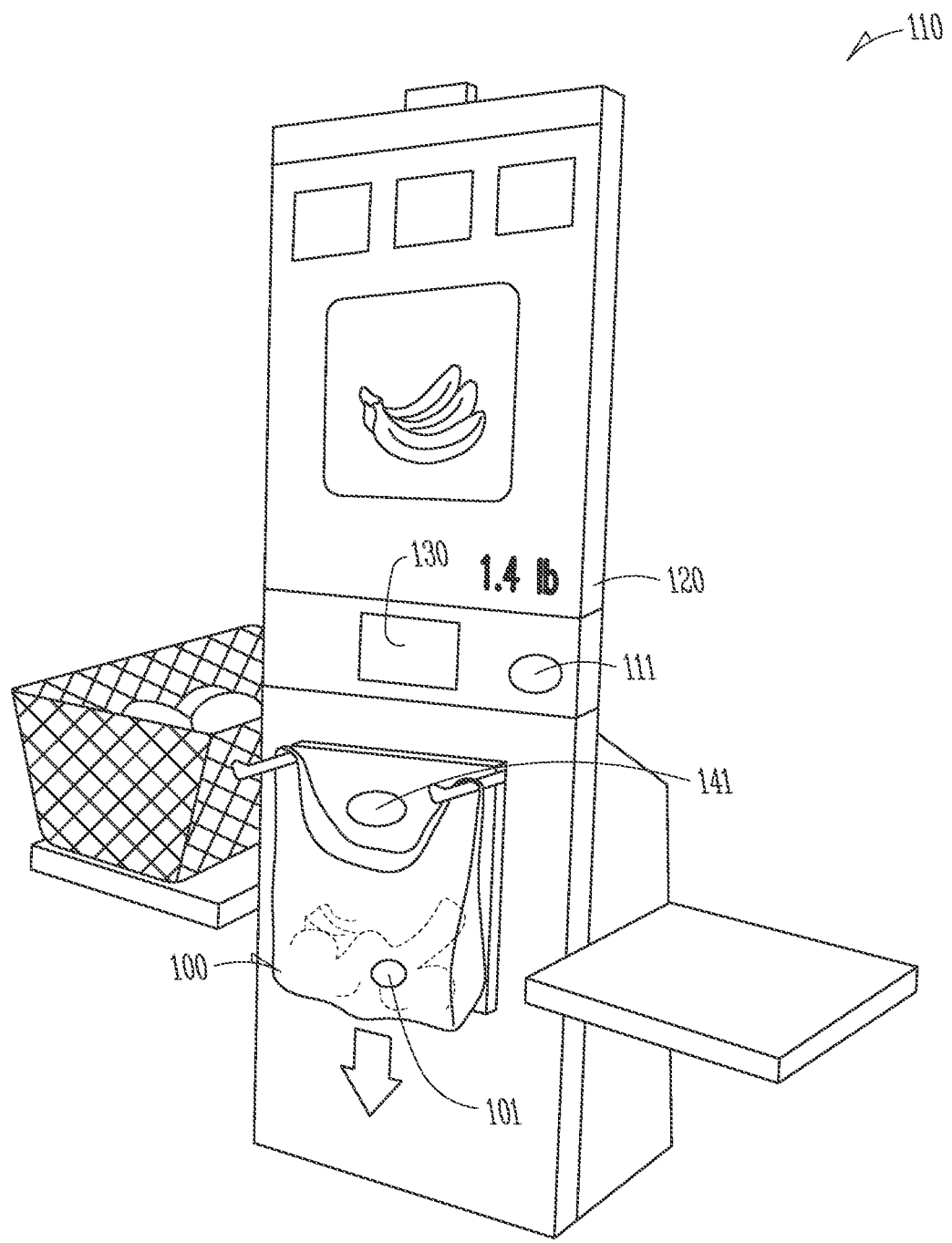
FIG. 1B is a diagram of a transaction terminal with a vertically integrated bagging scale holding a reusable bag with an integrated wireless identifier, according to an example embodiment.

FIG. 1B is a diagram of a transaction terminal 110 with a vertically integrated bagging scale 140 holding a reusable bag 100 with an integrated wireless identifier 101, according to an example embodiment. It is to be noted that the components are shown schematically in greatly simplified form, with only those components relevant to understanding of the embodiments being illustrated.

Furthermore, the various components (that are identified in the FIG. 1B) are illustrated and the arrangement of the components is presented for purposes of illustration only. It is to be noted that other arrangements with more or less components are possible without departing from the teachings of a reusable bag with an integrated wireless identifier and methods of operation presented herein and below.

As used herein "weigh scale" and "bagging scale" may be used interchangeably and synonymously. Further, the terms "customer," "consumer," "user,", and "operator" may be used interchangeably and synonymously herein; these terms refer to an individual that is conducting a transaction to checkout at transaction terminal 100 having the reusable bag 100 with the integrated wireless identifier 101.

The transaction terminal 110 includes: a wireless tag reader 111 (wireless transceiver 111), a display 120, a vertically integrated scanner 130, and a vertically integrated bagging scale 140 having a wireless tag reader 141. Terminal 110 also includes a processor and non-transitory computer-readable storage medium having a variety of executable instructions executed by the processor. Similarly, both the bagging scale 140 and the scanner 130 may include their own processors and non-transitory computer-readable storage medium having executable instructions executed by their corresponding processors.

A customer approaches terminal 110 for a checkout of items being purchased at a retailer. The customer hangs the bag 100 on two posts that extend horizontally out from the vertically integrated bagging scale 140. Either wireless tag reader 111 and/or wireless tag reader 141 identifies the tag 101 and obtains the unique identifier for the tag 101. The unique identifier is provided to a transaction manager 110 (discussed with the FIG. 1C below). Transaction manager 112 matches the unique identifier to a payment account and/or payment method. In some cases, the unique identifier may also be matched to a customer identifier for the customer associated with the bag 100/tag101.

As a consumer scans items for purchase at terminal 110 via the scanner 130, the items are placed in a reusable bag 100 having tag 101.

Weights are reported back to a transaction manager 112. Produce items that require weights during the transaction are placed in a bag 100 and the item weight reported back to transaction manager 112 for a price assignment based on an identified produce type. Existing security mechanisms to identify the produce type may be used, such as image identification by a camera integrated into terminal 110 and/or customer input through a transaction interface presented on a touchscreen display 120.

Transaction manager 112 identifies when the customer is finished and is ready to checkout based on a selection on a transaction interface presented on display 120 where the customer indicates a desire to checkout and pay for the items in the transaction. Transaction manager 112 obtains a transaction total for the transaction and charges the transaction total to the payment account linked or matched to the unique identifier of the tag 101. A confirmation screen may be presented and an option to print a transaction receipt. The customer grabs the bag 100 and exits the store.

The payment process and steps are completely automated requiring no customer input or need to provide any payment card. This increases security since no payment card is displayed at terminal 110 and no payment card details are swiped or inserted into terminal 110; still further, no card details are sent over any network wire or connection for payment processing. Payment processing is linked to a payment account and/or payment method through the unique identifier of the tag 101, which is integrated into the bag 100.

A variety of processing variations on the above-discussed scenario are possible with respect to the payment account/method linked to the tag 101 of the bag 100 and with respect to the transaction interface provided to the customer through the transaction manager 112 during checkout at terminal 110. These scenarios are discussed below with the FIG. 1C and system 170.

Moreover, it is noted that the terminal 110 does not have to have a vertically integrated bagging scale 140 as depicted in FIG. 1B; that is, the terminal 110 can have a conventional mechanical configuration and can be a Self-Service Terminal (SST) or a Point-Of-Sale (POS) terminal being operated by a cashier that is processing the transaction on behalf of the customer.

Figure 1C:
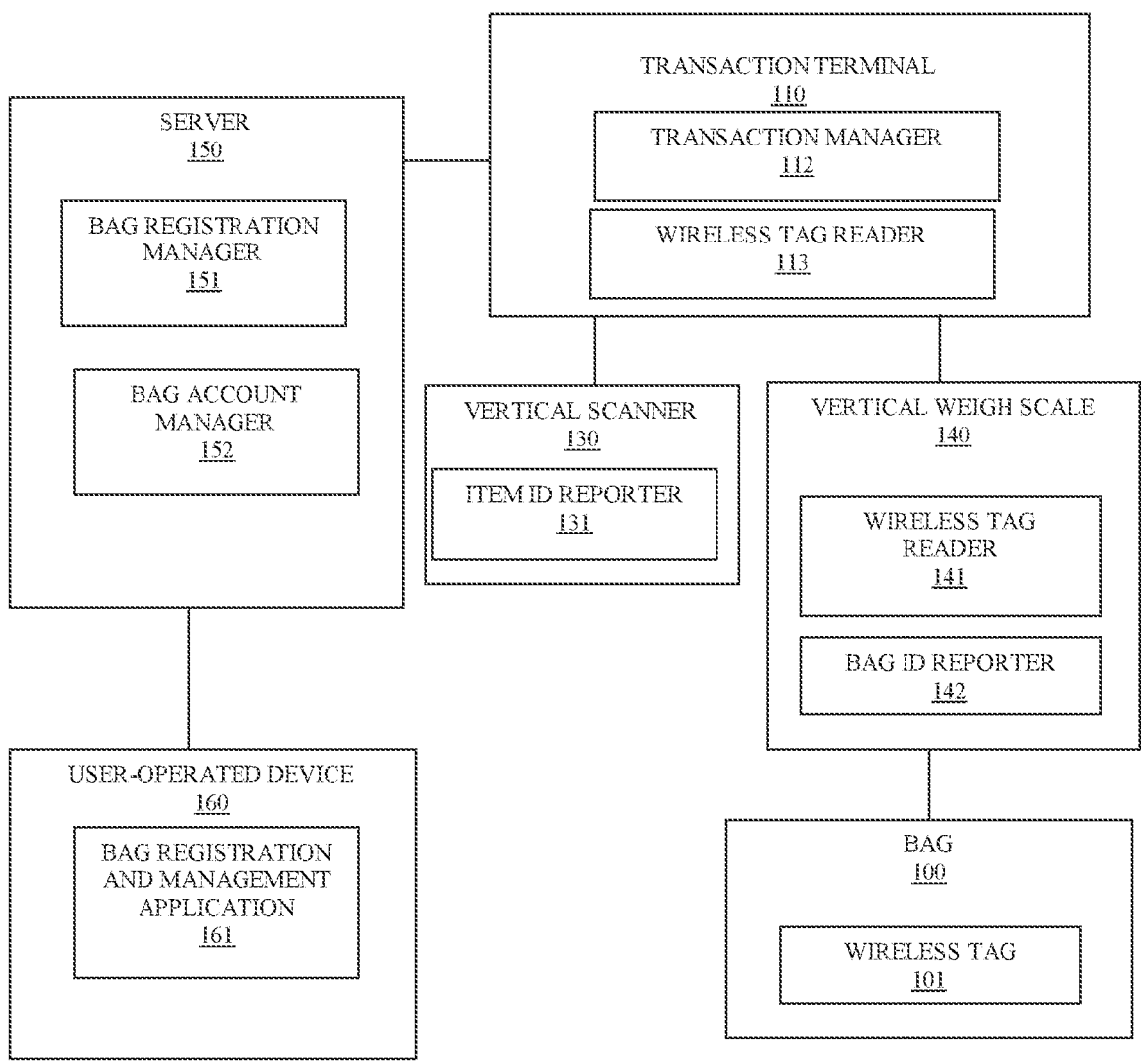
FIG. 1C is a diagram of a system for processing a transaction utilizing a reusable bag with integrated wireless identifier, according to an example embodiment.

FIG. 1C is a diagram of a system 170 for processing a transaction utilizing a reusable bag 100 with integrated wireless identifier 101, according to an example embodiment. Again, the system 170 is shown with only those components necessary for understanding the embodiments presented herein. Furthermore, the terminal 110 can have a combined scanner/scale that is horizontally situated and does not have to be the vertically integrated scanner 130 and separate scale 140 as illustrated in FIG. 1C and as was discussed above.

The system 170 includes a bag 100 with an integrated or affixed wireless tag 101, transaction terminal 110, display 120 (shown in FIG. 1B), vertical weigh scale 130, server 150, and user-operated device 160. Each device 110-160 includes its own processing and non-transitory computer-readable storage medium having executable instructions. The instructions when executed from the corresponding processors perform processing discussed herein and below for: transaction manager 112, wireless tag reader 113, item identifier (ID) reporter 131, wireless tag reader 141, bag ID reporter 142, bag registration manager 151, back account manager 152, and bag registration and management application 161 (herein after just "mobile application (app) 161").

Initially, a customer buys a bag 100 having tag 101 (or buys a tag 101 independent of bag 100 and affixes or integrates the tag 101 into bag 100). Mobile app 161 is used to register the bag 100/tag 101 with bag registration manager 151. It is noted that mobile app 161 can be a browser-based app accessed through a browser on device 160 to obtain a web-based interface set of pages for server 150 and bag registration manager 151. The bag 100/tag 101 may includes a Quick Response (QR) code on the bag 100, the tag 101, and/or packaging associated with the bag 100 and/or the tag 101 (the packaging may be a label affixed to the bag 100 that the customer subsequently cuts off the bag 100). Mobile app 161 access an integrated camera of device 160 and is operated by the customer to scan the QR code. This may automatically bring up an interface within the app 161 or within a browser an interface for registering the bag 100/tag 101 with bag registration manager 151. The interface of bag registration manager 151 collects information for the tag 101 such as its identifier and determines if it is already linked to a payment account, such as when the customer purchases the bag 100/tag 101 as a gift card wherein a gift card account is already funded with money prepaid by the customer. If the tag 101 is not associated with any account, the interface asks the customer for necessary information to establish the account linkage to the tag 101, such as credit card account number, retail account number, debit card account number, etc.

In some cases, the interface of manager 151 permits the customer to custom-defined rules of conditions for the tag 101, such as setting a limit on how much money can be used in connection with the tag 101 as payment for transactions within a given time period (e.g., $100 per week, $500 per month, etc.). Other rules may indicate there is no set money limit for transaction purchases; number of uses (number of transactions) for which the tag 101 can be used (e.g., 1 time use only, 2 times a month, 10 total times, etc.), number of uses with set money limits (e.g., 2 times a month, each time no more than $200, etc.). There may also be no limits at all placed on transaction usage for the tag 101 by the customer.

In fact, the customer can define whatever limits that are to be placed on the tag 101 in terms of payment and/or goods purchased based on any combination or all of: number of transaction usages, frequency of uses, money limits, time limits (e.g., only good for one month and expires, etc.), types of items prohibited (e.g., alcohol, tobacco, cloths, makeup, etc.), types of items allowed (e.g., food, groceries), specific retailers for use (e.g., Krogers®, KohIs®, etc.), and/or specific categories of retailers (e.g., groceries, clothing, etc.).

Bag registration manager 151 may or may not require customer contact information (phone number, email) for purposes of contact the customer or sending reports on bag 100/tag 101 usage.

Once tag 101 is registered, the customer or whoever the customer purchased the bag 100/tag 101 for may then use the bag as payment with terminal 110 for items being purchased subject to any conditions defined by the customer during registration as discussed above.

Customer or person given bag 100 by the customer (hereinafter just referred to as "shopper"), then visits a store for purchasing items. When the shopper is ready to check out, shopper approaches terminal 110 (operated as an SST or a cashier-assisted POS terminal) with items and bag 100 having tag 101. Wireless tag reader 140 (using bag ID reporter 142) or wireless tag reader 113 identified tag 101 and obtains the unique identifier, which is provided to transaction manager 112. Transaction manager 112 sends the unique identifier to bag account manager 152, bag account manager returns a payment account/method linked to tag 101 based on the unique identifier and any conditions and rules associated with the tag 101. Bag account manager 152 provides the account details and any conditions/rules if present to transaction manager 112.

Shopper proceeds to scan items or have then scanned through scanner 130, the item identifiers are returned by item ID reporter to transaction manager 112. Transaction manager 112 maintains a listing of item identifiers, item descriptions, item quantities, item pricing, and a running total for the transaction. When a checkout option is received by transaction manager 112, the transaction total is charged to the linked payment account associated with tag 101, and a transaction receipt is printed.

If the transaction total exceeds what is available on the payment account or is available according to any conditions/rules, transaction manager 112 presents an interface screen indicating that only $X was available and $Y are still needed. Shopper may then provide a payment card for the difference or remove selected items from the transaction to stay at $X. The rules and conditions, if present, may have been provided by bag account manager 152 to transaction manager 112 with running totals (such as 2 uses this month, $Z dollars used), such that transaction manager 112 can determine whether the transaction total price or just a portion of transaction total price can be satisfied by the linked account. The running totals for rules may also be obtained by transaction manager 112 from bag account manager 152 once the transaction total is known and the checkout option is being processed by transaction manager 112. Any rules associated with specific goods being purchased or types of goods can be excluded and transaction manager 112 may request through the transaction interface that those excluded items be paid for with a separate payment card or removed from the transaction entirely.

In an embodiment, the wireless tag 101 identifier may be acquired when checkout is requested on terminal 110 or at any time as a transaction is being processed on terminal 110 before checkout is requested. That is, the shopper does not have to present the bag 100 at the start of the transaction and may present it at any time during the transaction or when checkout is selected by the shopper.

In an embodiment, mobile app 161 or web-based interface may permit the customer to interact with bag account manager 152 for purposes of funding an account linked to tag 101, changing an account linked to tag 101, and/or receiving reports on transactions associated with tag 101.

In an embodiment, where terminal 110 includes vertical weigh scale 140, rules or conditions placed on usage of tag 101 may include weight of items purchased for the bag 100.

In a frictionless store application, bag 100 with tag 101 may be used for purposes of checking a shopper into the store for a transaction. Here, a check-in kiosk or two wireless transceivers that the shopper walks through upon entering the store reads the unique identifier of the tag 101 in possession of the shopper and notifies transaction terminal 110 and/or associates the linked shopper to the bag 100 with images taken of the shopper within the store. This is done without any mobile device being required of the shopper. It is noted that in this embodiment terminal 110 may not be used at all; rather transaction manager 112 may be server-based.

In an embodiment, the shopper lacks a mobile device while shopping and is only in possession of bag 100 with tag 101. The shopper can shop, checkout, and pay for the items entirely based on tag 101.

These and other embodiments are now discussed with reference to FIGS. 2-4.

Figure 2:
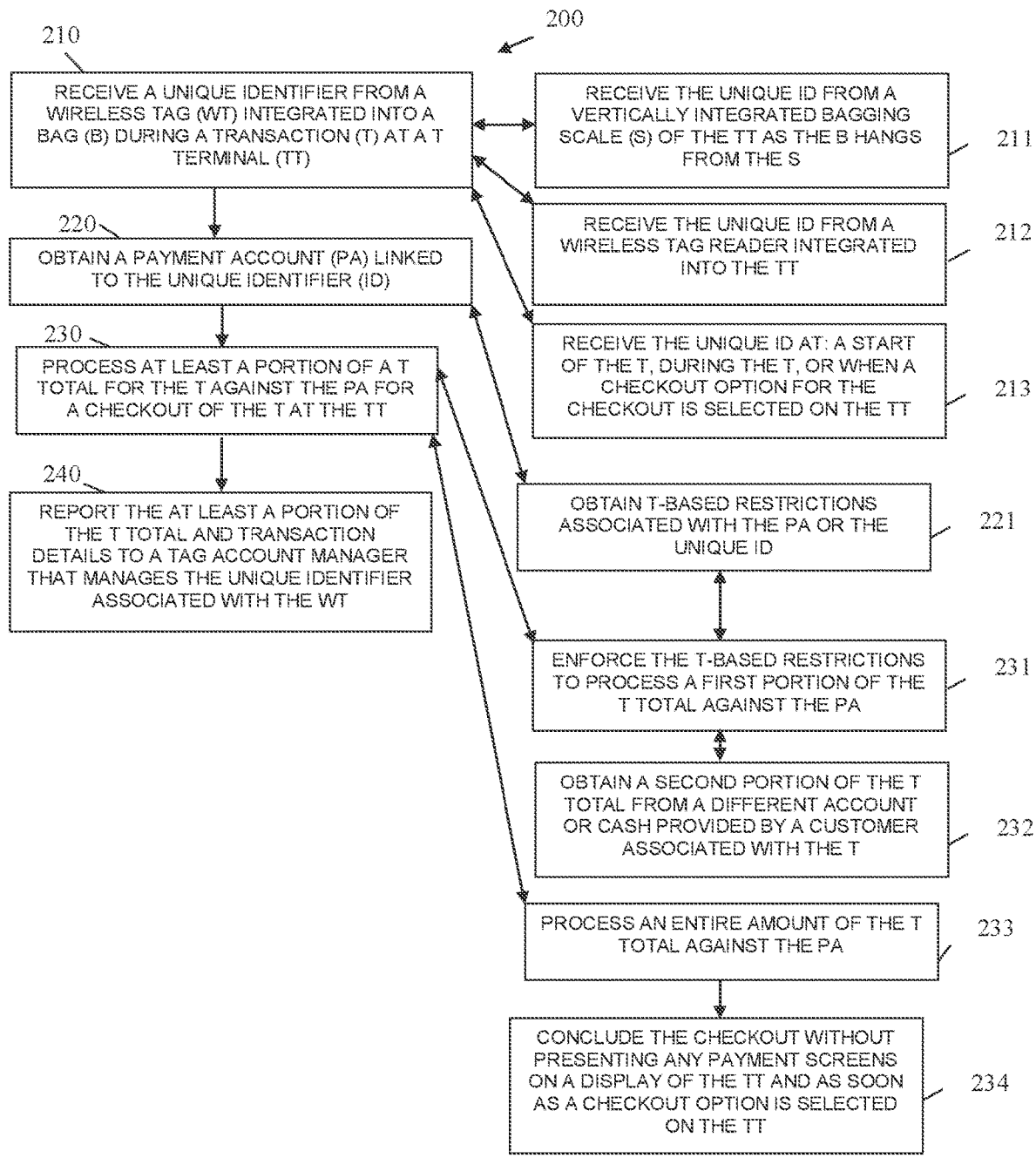
FIG. 2 is a diagram of a method for processing a transaction utilizing a reusable bag with integrated wireless identifier, according to an example embodiment.

FIG. 2 is a diagram of a method 200 for processing a transaction utilizing a reusable bag with integrated wireless identifier, according to an example embodiment. The software module(s) that implements the method 200 is referred to as a "transaction manager." The transaction manager is implemented as executable instructions programmed and residing within memory and/or a non-transitory computer-readable (processor-readable) storage medium and executed by one or more processors of a device. The processor of the device that executes the transaction manager are specifically configured and programmed to process the transaction manager. The transaction manager may include one or more connections during operation; any such network connections may be wired, wireless, or a combination of wired and wireless.

In an embodiment, the device that executes the transaction is transaction terminal 110. In an embodiment, transaction terminal 110 is an SST, a POS terminal, or a kiosk. In an embodiment, transaction terminal 110 includes an integrated vertical weigh scale 140 as discussed above with the FIGS. 1B-1C.

The transaction manager is all or some combination of: transaction manager 112 and/or bag ID reporter 142.

At 210, the transaction manager receives a unique identifier from a wireless tag integrated into a reusable bag (canvas, cloth, non-plastic) during a transaction at a transaction terminal.

In an embodiment, at 211, the transaction manager receives the unique identifier from a vertically integrated bagging scale 140 of the transaction terminal as the reusable bag hangs from the scale 140.

In an embodiment, at 212, the transaction manager receives the unique identifier from a wireless tag reader 113 that is integrated into the transaction terminal 110. In an embodiment, the wireless tag reader is an RF reader, an NFC reader, or a Bluetooth® Low Energy (BLE) reader integrated into the transaction terminal 110.

In an embodiment, at 213, the transaction manager receives the unique identifier read from or broadcast from the tag at: a start of the transaction, during the transaction (after the start but before checkout), or when a checkout option for the checkout is selected on the transaction terminal.

At 220, the transaction manager obtains a payment account linked to the unique identifier. This can be obtained from a server-based bag account manager 152 of server 150 by the transaction manager.

In an embodiment, at 221, the transaction manager obtains a transaction-based restrictions associated with the payment account or the unique identifier of the wireless tag.

At 230, the transaction manager processes at least a portion of a transaction total for the transaction against the payment account for a checkout of the transaction at the transaction terminal.

In an embodiment of 221 and 230, at 231, the transaction manager enforces transaction-based restrictions to process a first portion of the transaction total against the payment account. These transaction-based restrictions can be associated within any of the above-noted custom rules or conditions associated with the payment account.

In an embodiment of 231 and at 232, the transaction manager obtains a second portion or remaining portion of the transaction total from a different account or cash provided by a customer associated with the transaction. In other words, at 231 only some items purchased by the customer for the transaction can be paid for using the payment account and at 232 the remaining items in the transaction have to be paid for using a different account of cash.

In an embodiment, at 233, the transaction manager processes an entire amount of the transaction total against the payment account.

In an embodiment of 233 and at 234, the transaction manager concludes the checkout without presenting any payment screens on a display of the transaction terminal and as soon as a checkout option is selected on the transaction terminal. Here, the customer of the transaction simply selects the checkout option indicating there is no more items to process for the transaction, picks up the reusable bag and exits the store.

In an embodiment, at 240, the transaction manager reports the at least a portion of the transaction total and transaction details to a tag account manager that manages the unique identifier associated with the wireless tag. In an embodiment, the tag account manager is the bag account manager 152.

Figure 3:
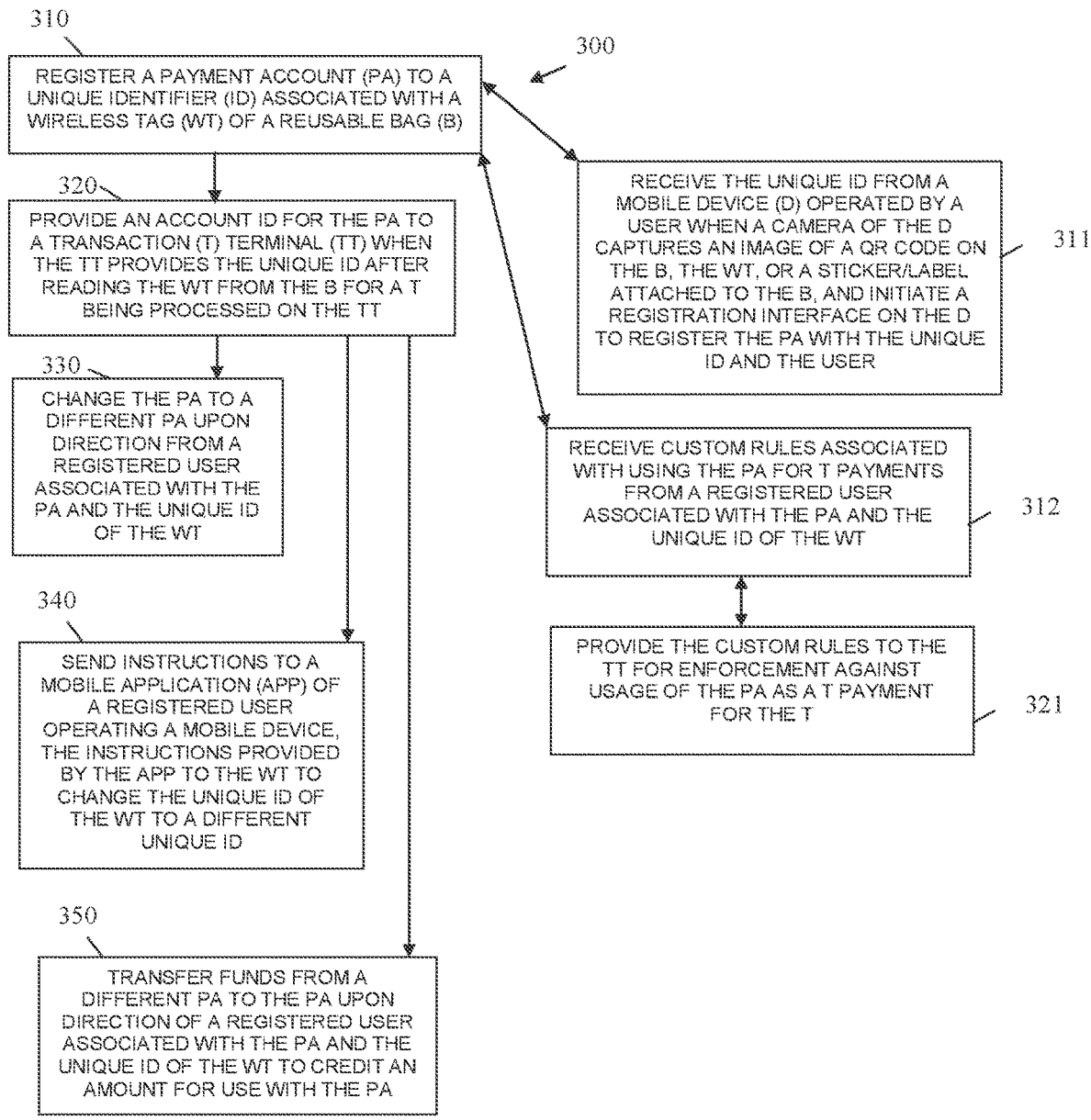
FIG. 3 is a diagram of another method for processing a transaction utilizing a reusable bag with integrated wireless identifier, according to an example embodiment.

FIG. 3 is a diagram of another method 300 for processing a transaction utilizing a reusable bag with integrated wireless identifier, according to an example embodiment. The software module(s) that implements the method 300 is referred to as a "tag manager." The tag manager is implemented as executable instructions programmed and residing within memory and/or a non-transitory computer-readable (processor-readable) storage medium and executed by one or more processors of a device. The processor of the device that executes the tag manager are specifically configured and programmed to process the tag manager. The tag manager may include one or more connections during operation; any such network connections may be wired, wireless, or a combination of wired and wireless.

In an embodiment, the device that executes tag manager is server 150. In an embodiment, server 150 is one of a collection of servers that logically cooperate as a cloud processing environment or cloud.

In an embodiment, tag manager is all or some combination of bag registration manager 151 and/or bag account manager.

The tag manager represents processing from a server that interacts with a terminal as discussed above with respect to terminal 110 and method 200.

At 310, the tag manager registers a payment account to a unique identifier associated with a wireless tag of a reusable bag (canvas, cloth, non-plastic).

In an embodiment, at 311, the transaction manager receives the unique identifier from a mobile device operated by a user when a camera of the mobile device captures an image of a QR code on the reusable bag, the wireless tag, or a sticker/label attached to the reusable bag. The transaction manager in response to or responsive to the encoded information of the QR code identifies the unique identifier and launches or initiates on the mobile device a registration interface to perform the registering at 310 with the unique identifier assigned to the wireless tag.

In an embodiment, at 312, the transaction manager receives custom rules associated with using the payment account for transaction payments from a registered user associated with the payment account and the unique identifier of the wireless tag.

At 320, the transaction manager provides an account identifier for the payment account to a transaction terminal when the transaction terminal provides the unique identifier after reading the wireless tag from the reusable bag for a transaction being processed on the transaction terminal.

In an embodiment, at 330, the transaction manager changes the payment account to a different payment account upon direction from a registered user associated with the payment account and the unique identifier of the wireless tag.

In an embodiment, at 340, the transaction manager sends instructions to a mobile application of a registered user operating a mobile device. The instructions are provided by the mobile application to the wireless tag (wirelessly) to cause firmware of the wireless tag to change its unique identifier to a different unique identifier.

In an embodiment, at 350, the transaction manager transfers funds from a different payment account to the payment account upon direction of a registered user associated with the payment account and the unique identifier of the wireless tag to credit an amount for use with the payment account. This provides a mechanism by which the registered user can replenish funds of the payment account for debiting during transaction payments for transactions.

Figure 4:
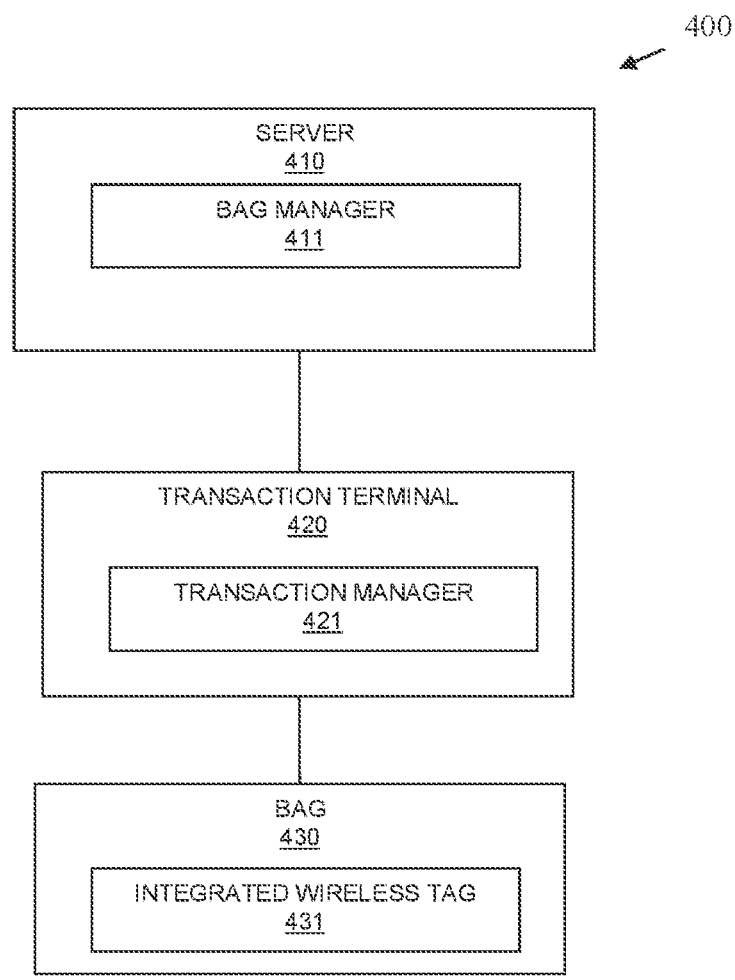
FIG. 4 is a diagram of another system for processing a transaction utilizing a reusable bag with integrated wireless identifier, according to an example embodiment.

FIG. 4 is a diagram of another system 400 for processing a transaction utilizing a reusable bag with integrated wireless identifier, according to an example embodiment. The system 400 includes a variety of hardware components and software components executed by and programmed into the hardware components. The system 400 includes one or more network connections during operation, any such network connections can be wired, wireless, and/or a combination of wired and wireless.

In an embodiment, system 400 implements, inter alia, the processing discussed above with respect to FIGS. 1A-1C and 2-4.

The system 400 includes a server 410, a transaction terminal 420, and a bag 430 having an integrated wireless tag 431.

The server 410 includes a server processor and a server non-transitory computer-readable storage medium having executable instructions representing bag manager 411.

Bag manager 411 when executed by server processor from the server non-transitory computer-readable storage medium causes server processor to perform processing to: 1) link a payment account to a unique identifier associated with the integrated wireless tag 431; and 2) provide an account identifier for the payment account to the transaction manager 421 during a transaction when the transaction manager 421 provides the unique identifier.

Transaction terminal 420 includes a terminal processor and a terminal non-transitory computer-readable storage medium having executable instructions representing transaction manager 421.

Transaction terminal 420 when executed by terminal processor from the terminal non-transitory computer-readable storage medium causes terminal processor to perform processing to: 1) wirelessly read the unique identifier from the integrated wireless tag 431 of reusable bag 430 during the transaction; 2) provide the unique identifier to the bag manager 411; 3) obtain the account identifier for the payment account from the bag manager 411; and 4) process at least a portion of a transaction total price for the transaction against the payment account using the account identifier when a checkout option is selected from a transaction interface of the transaction terminal 420.

In an embodiment, the integrated wireless tag 431 is: a passive wireless tag, an active wireless tag, a combination passive and active wireless tag, or a smart wireless tag.

In an embodiment, server 410 is server 150. In an embodiment, server 410 is part of a cloud processing environment.

In an embodiment, bag manager 411 is all or some combination of: bag registration manager 151, bag account manager 152, and/or method 300 of FIG. 3.

In an embodiment, transaction terminal 420 is transaction terminal 110. In an embodiment, transaction terminal 110 is an SST, a POS terminal, or a kiosk.

In an embodiment, transaction manager 421 is all or some combination of: transaction manager 112, wireless tag reader 113, and/or method 200 of FIG. 2.

In an embodiment, bag 430 is bag 100 and integrated wireless tag 431 is tag 101. In an embodiment, tag 431 is a passive wireless tag, an active wireless tag, a combination of both passive and active wireless tag, or a smart tag (as discussed above with FIG. 1A).

Although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a transaction terminal causing the processor to execute the executable instructions and perform operations comprising:
  wirelessly interacting with a wireless tag that is integrated into a bag during a transaction at a transaction terminal by sending electromagnetic waves from a wireless tag reader of a vertically integrated bagging scale of the transaction terminal causing the wireless tag to power on and communicate with the vertically integrated bagging scale when the bag hangs from two horizontal posts that extend out horizontally from the vertically integrated bagging scale of the transaction terminal;
  receiving, by the vertically integrated bagging scale, a unique identifier from the wireless tag;
  obtaining, from a server, a payment account linked to the unique identifier of the bag and custom-defined rules associated with the unique identifier, wherein the custom-defined rules associated with the unique identifier during initial registration of the wireless tag and associated with the payment account;
  updating the transaction as items are scanned at the transaction terminal and placed in the bag;
  recording weights of the items including produce items placed in the bag as each item that is scanned is placed in the bag and as each produce item is identified and placed in the bag; and
  processing at least a portion of a transaction total for the transaction against the payment account based on enforcement of the custom-defined rules for a checkout of the transaction at the transaction terminal when a transaction interface of the transaction terminal indicates a checkout and pay option was activated for the transaction.

2. The method of claim 1, wherein receiving further includes receiving the unique identifier at: a start of the transaction, during the transaction, or when a checkout option for the checkout is selected on the transaction terminal.

3. The method of claim 1, wherein obtaining further includes obtaining transaction-based restrictions associated with the payment account or the unique identifier.

4. The method of claim 3, wherein processing further includes enforcing the transaction-based restrictions to process a first portion of the transaction total against the payment account.

5. The method of claim 4, wherein enforcing further includes obtaining a second portion of the transaction total from a different account or cash provided by a customer associated with the transaction.

6. The method of claim 1, wherein processing further includes processing an entire amount of the transaction total against the payment account.

7. The method of claim 6 further comprising, concluding the checkout without presenting any payment screens on a display of the transaction terminal and as soon as a checkout option is selected on the transaction terminal.

8. The method of claim 1 further comprising, reporting the at least a portion of the transaction total and transaction details to a tag account manager that manages the unique identifier associated with the wireless tag.

9. A method, comprising:
providing executable instructions to a processor of a server causing the processor to execute the executable instructions and perform operations comprising:
registering a payment account to a unique identifier associated with a wireless tag of a reusable bag during registration and interaction with a mobile application, wherein registering further includes receiving custom rules associated with using the payment account for transaction payments from a registered user associated with the payment account and the unique identifier of the wireless tag;
providing an account identifier for the payment account and the custom rules linked to the payment account to a transaction terminal when the transaction terminal provides the unique identifier after a wireless tag reader of a vertically integrated bagging scale of the transaction terminal sends electromagnetic waves causing the wireless tag to power on and communicate with the vertically integrated bagging scale when the bag hangs from two horizontal posts that extend out horizontally from the vertically integrated bagging scale of the transaction terminal, wherein the vertically integrated bagging scale reads the unique identifier from the wireless tag of the reusable bag for a transaction being processed on the transaction terminal through wireless interaction between the transaction terminal and the wireless tag of the reusable bag and wherein the transaction terminal provides the unique identifier to the server, wherein the unique identifier is linked to the account identifier and the custom rules; and
processing the payment account for the transaction when a transaction interface of the transaction terminal indicates a checkout and pay option was activated for the transaction without the transaction interface presenting any payment screens on a display of the transaction terminal for the checkout and pay option.

10. The method of claim 9 further comprising, changing the payment account to a different payment account upon direction from a registered user associated with the payment account and the unique identifier of the wireless tag.

11. The method of claim 9 further comprising, sending instructions to the mobile application of a registered user operating a mobile device, wherein the instructions provided by the mobile application to the wireless tag to change the unique identifier of the wireless tag to a different unique identifier.

12. The method of claim 9 further comprising, transferring funds from a different payment account to the payment account upon direction of a registered user associated with the payment account and the unique identifier of the wireless tag to credit an amount for use with the payment account.

13. A system comprising:
a server comprising a server processor and a server non-transitory computer-readable storage medium having executable instructions representing a bag manager;
a transaction terminal comprising vertically integrated bagging scale with a wireless tag reader, a transaction processor, and a transaction non-transitory computer-readable storage medium having executable instructions representing a transaction manager;
a reusable bag comprising an integrated wireless tag;
the bag manager when executed by the server processor from the server non-transitory computer-readable storage medium causes the server processor to:
link a payment account to a unique identifier associated with the integrated wireless tag of the reusable bag; and
provide an account identifier for the payment account and custom-defined rules associated with the account identifier to the transaction manager during a transaction when the transaction manager provides the unique identifier;
the transaction manager when executed by the transaction processor from the transaction non-transitory computer-readable storage medium causes the transaction processor to:
wireless interact with the integrated wireless tag of the reusable bag during the transaction by sending electromagnetic waves from a wireless tag reader of a vertically integrated bagging scale of the transaction terminal causing the wireless tag to power on and communicate with the vertically integrated bagging scale when the bag hangs from two horizontal post that extend out horizontally from the vertically integrated bagging scale of the transaction terminal;
wirelessly read the unique identifier from the integrated wireless tag of the reusable bag;
provide the unique identifier to the bag manager;
obtain the account identifier for the payment account from the bag manager;
updating the transaction as items are scanned at the transaction terminal and placed in the reusable bag;
recording weights of the items and produce items placed in bag as each item that is scanned is placed in the bag and as each produce item is identified and placed in the bag; and
process at least a portion of a transaction total price for the transaction against the payment account using the account identifier and based on enforcement of the customer-defined rules when a checkout option is selected from a transaction interface of the transaction terminal.

\* \* \* \* \*